United States Patent

[11] 3,634,023

| [72] | Inventor | Danny R. Foote<br>Spirit Lake, Iowa |
| --- | --- | --- |
| [21] | Appl. No. | 811,570 |
| [22] | Filed | Mar. 28, 1969 |
| [45] | Patented | Jan. 11, 1972 |
| [73] | Assignee | Berkley & Company, Inc.<br>Spirit Lake, Iowa |

[54] SURFACE FINISH FOR NYLON MONOFILAMENT
8 Claims, No Drawings

[52] U.S. Cl.................................................. 8/130.1,
8/172, 260/326 N
[51] Int. Cl....................................................... D06m 13/40
[50] Field of Search............................................ 8/130.1,
DIG. 21, 172; 260/32.6 N

[56] References Cited
UNITED STATES PATENTS

| 2,289,377 | 7/1942 | Miles............................ | 18/54 |
| --- | --- | --- | --- |
| 2,298,071 | 10/1942 | Smith............................ | 139/420 |
| 2,214,405 | 9/1940 | Coffman........................ | 260/33 |

Primary Examiner—Donald Levy
Assistant Examiner—B. Bettis
Attorney—Orrin M. Haugen ABSTRACT: A technique for improving the physical properties of nylon filamentary products, in particular nylon monofilament, which includes the treating of such filamentary products with a composition having the structural formula:

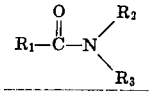

wherein $R_1$ represents an aromatic or an aliphatic radical selected from the group consisting of benzyl, toluyl, xylyl and napthyl radicals, and cyclohexyl and alkyl substituted cyclohexyl radicals; $R_2$ represents a radical selected from the group consisting of hydrogen and alkyl groups having from one to 10 carbon atoms; and $R_3$ represents an alkyl group having from one to 10 carbon atoms. Compositions falling within the scope of the structural definition function as a surface plasticizer and is preferably applied as a film to the surface of the nylon filamentary material. As an alternative, particularly when the composition is in the solid state at ordinary ambient conditions, this material may be added to molding pellets or powder prior to the drawing of a filament therefrom. One particularly useful composition for this treatment is N,N-diethyl-meta-toluamide.

SURFACE FINISH FOR NYLON MONOFILAMENT

The present invention relates generally to the art of treating nylon filamentary material, and more particularly to the art of improving the physical properties of nylon filamentary products, those physical properties which are improved including the tensile strength and the overhand knot strength. The present invention includes the treatment of nylon filamentary products with a small quantity of a composition having the structural formula:

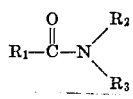

wherein $R_1$ represents an aromatic or an aliphatic radical selected from the group consisting of benzyl, toluyl, xylyl, and napthyl radicals, and cyclohexyl and alkyl substituted cyclohexyl radicals; $R_2$ represents a radical selected from the group consisting of hydrogen and alkyl groups having from 1 to 10 carbon atoms; and $R_3$ represents an alkyl group having from 1 to 10 carbon atoms. N,N-diethyl-meta-toluamide is particularly well adapted for this function.

Nylon is a synthetic linear polyamide which is readily extruded into a filamentary product. Generally speaking, the word "nylon" is a generic term for any of a variety of long-chain polymeric amides which have recurring groups identified as—[CONH]—as an integral part of the main polymer chain. The term is not intended to define a particular product, but rather a family of chemically related polymeric amides which may comprise different reactant materials. Typical nylons are nylon 6, which is obtained by polymerization of caprolactam, nylon 66, a nylon obtained by the condensation of hexamethylenediamine with adipic acid (polyhexamethylene adipamide), or the like. Nylon 610 is prepared by the condensation of hexamethylenediamine with sebacic acid and is a well-known material. Nylons may also be formulated as the reactant products of ethyl aminoheptanoate, 9-aminononanoic acid, of 11-aminoundecanoic acid. Various mixtures of these various reactants may be employed to provide copolyamides or inter-polyamides, all of which fall within the generic category of "nylon."

While nylon filamentary products are well known for their high strength, toughness, and durability, these characteristics may nevertheless be improved by treatment in accordance with the present invention. In this connection, a plasticizer is introduced into the filamentary product having the structural formula as follows:

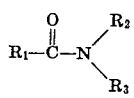

wherein $R_1$ represents an aromatic or an aliphatic radical selected from the group consisting of benzyl, toluyl, xylyl and napthyl radicals, and cyclohexyl and alkyl substituted cyclohexyl radicals; $R_2$ represents a radical selected from the group consisting of hydrogen and alkyl groups having from 1 to 10 carbon atoms; and $R_3$ represents an alkyl group having from 1 to 10 carbon atoms. This material may be added to the nylon either prior to its being extruded or drawn into filaments, or may be applied as a film upon the surface of a previously prepared monofilament.

In the past, it has been traditional to attempt to raise the overhand knot strength of nylon monofilament fishing line by applying various lubricating films to the surface of the line. The most popular and most widely used of these lubricating films are silicone oils. Generally, these silicone lubricating oils improve the knot strength by an amount not greater than about 5 percent, and in the case of certain soft nylon formulations, the presence of the silicone oil has actually been found to lower the knot strength. These oils have been utilized primarily because they impart a smooth, slippery feel to the line and are generally desired for that reason.

The treatment of nylon monofilament with the amides recited hereinabove, such as, for example, N,N-diethyl-meta-toluamide does not appear to reduce or otherwise affect the high-straight tensile properties, smooth feel, low elongation, and water extraction qualities of the product. It has also been found that overhand knot strengths are generally increased by from between 15 to 30 percent.

The present invention has particular utility in the treatment of nylon monofilament fishing line. The amide, when introduced into the nylon monofilament, is resistant to leaching, and thus provides a permanent improvement in the product. This is particularly important in connection with nylon monofilament fishing lines, since the utility depends substantially upon the degree of permanency of the improvement.

Therefore, it is an object of the present invention to provide an improved plasticizer for nylon filamentary products, the plasticizer consisting essentially of a composition having the structural formula:

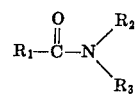

wherein $R_1$ represents an aromatic or an aliphatic radical selected from the group consisting of benzyl, toluyl, xylyl and napthyl radicals, and cyclohexyl and alkyl substituted cyclohexyl radicals; $R_2$ represents a radical selected from the group consisting of hydrogen and alkyl groups having from 1 to 10 carbon atoms; and $R_3$ represents an alkyl group having from 1 to 10 carbon atoms.

It is yet a further object of the present invention to provide an improved treatment for nylon monofilament fishing line, which treatment includes the plasticization of nylon monofilament with such amide compositions.

It is still a further object of the present invention to provide an improved treatment for nylon monofilament fishing lines which treatment permanently increases the tensile strength and overhand knot strength of such fishing lines, the treatment comprising the addition of such amide compositions, for example, N,N-diethyl-meta-toluamide to the composition of the line.

Other and further objects of the present invention will become apparent to those skilled in the art upon a study of the following specification including the specific examples recited therein, and the appended claims.

As indicated, the foregoing objects of the present invention are generally attained by exposing the nylon filaments to these certain amide compositions either by incorporating the material in the extruded monofilament, or by wiping a film of the material along the surface thereof.

Nylon monofilament materials may be produced, for example, from synthetic linear polyamides such as those described in U.S. Pat. Nos. 2,071,250; 2,071,253; 2,130,948; 2,251,508; and 2,341,423. One specific product which is particularly enhanced by treatment in accordance with the present invention is that certain polyamide made in accordance with U.S. Pat. No. 3,182,100.

In introducing or exposing the monofilament to the amide composition, such as for example, N,N-diethyl-meta-toluamide, any suitable means may be employed, as indicated hereinabove. The introduction or contact may be accomplished at room temperature, or at any temperature up to but below the softening point of the filaments being treated. The time of contact, when surface treatment is being utilized, is sufficient to permit assimilation of the material into the surface, this generally requiring exposure of at least several minutes. Again, this exposure time is not critical, since if surface treatment is being utilized, a film will be gradually assimilated into the product over a period of several days.

As previously indicated, one particularly advantageous amide composition is N,N-diethyl-meta-toluamide, this material being commercially available. The corresponding benzamide or xylamide may also be employed with equivalent results. In addition, the system may employ primary amines or secondary amines, with alkyl groups having from between 1 to 10 carbon atoms. The materials function in a similar fashion, although with the higher molecular weight substances, it is ordinarily essential to either heat the material if it is to be applied as a surface film, or use the substance as an internal plasticizer.

Examples of amines which are commercially available, and which may be utilized in the amide portion of the composition are as follows:

| Primary Amines | Secondary Amines |
| --- | --- |
| Methyl | Dimethyl |
| Ethyl | Diethyl |
| Isopropyl | Diisopropyl |
| Butyl | Dipropyl |
| 2-Ethylhexyl | Dibutyl |
| Amyl (mixed isomers) | Di (2-Ethylhexyl) |
| Hexyl | Methyl Butyl |
| Isodecyl | Ethyl Butyl |
| | Diamyl (mixed isomers) |
| | Didecyl (mixed isomers) |

Obviously, there are various combinations and possibilities of acids and amines which may be utilized, however the commercially available materials are, of course, preferred.

The amides which have been found useful in nylon treatment are obtained as the reactant product of the acid and amine, the reactant product being in the form of a salt. This reactant product is dehydrated, such as, for example, by distillation and ultimately separated from the reactant mass. A typical preparation is described hereinbelow:

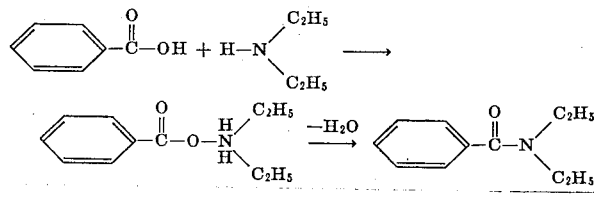

In order to enable those skilled in the art to better understand how the present invention may be practiced, the following examples are given.

EXAMPLE I a 6/610/66 polyamide or copolyamide consisting of the reaction product of 45 percent caprolactam, 45 percent hexamethylene sebacamide, and 10 percent hexamethylene adipamide was plasticized with 2-ethyl-1, 3-hexanediol to form a plasticized material containing 14 percent diol plasticizer. This material which is available commercially such as from E. I. DuPont deNemours Co. of Wilmington, Delaware under the name "Nylon 69" is arbitrarily called "-Copolymer A," the commercial product containing the diol plasticizer as indicated. Copolymer A was physically mixed with poly-caprolactam molding pellets in the proportion of 50 percent Copolymer A, 50 percent polycaprolactam. The mixtures were fed to a screw extruder and extruded into a filament which was cooled and oriented (stretched) to obtain the maximum possible strength in each case. The material in the extruder was heated to approximately 475° F. and was permitted to remain no longer than a few minutes in its molten state while proceeding through the auger of a standard extruder, following which the material was immediately chilled and stretched.

A 0.012 inch filament was extruded from the prepared material, and two strands of the product were separated. Separate towels, one containing N,N-diethyl-meta-toluamide, the other containing a silicone base oil were prepared, one being utilized to wipe the surface of the first strand, the other being utilized to wipe the surface of the other strand. Typical results for this material are set forth in table 1 hereinbelow:

TABLE 1

| | Straight Tensile Test | Elongation | Overhand Knot Test |
| --- | --- | --- | --- |
| N,N-diethyl-meta-toluamide treated monofilament | 124,500 p.s.i. | 14.7% | 64,800 p.s.i. |
| Silicone treated monofilament | 115,200 p.s.i. | 15.2% | 51,800 p.s.i. |

Similar enhanced characteristics have been achieved with other nylon reactant products, and with other sizes.

EXAMPLE II

The polyamide composition as set forth in example I was treated with an additive of 8.0 percent by weight of N,N-diethyl-meta-toluamide. The produce was tumbled in order to absorb the material into the polyamide composition. The material was dried and thereafter extruded into filaments. A control sample was prepared using the same technique except the N,N-diethyl-meta-toluamide was omitted and a commercially available sulfonamide plasticizer added, and the material was used as a control. Typical results are set forth in table 2.

TABLE 2

| | Straight Test | Elongation | Overhand Knot Test |
| --- | --- | --- | --- |
| Control | 117,750 p.s.i. | 15.8% | 53,000 p.s.i. |
| N,N-diethyl-meta-toluamide treated monofilament | 109,100 p.s.i. | 18.5% | 56,800 p.s.i. |

In this treatment, some of the N,N-diethyl-meta-toluamide was lost in the treatment, prior to extrusion. The quantity preserved is, of course, substantially smaller than 8.0 percent.

Similar enhancement of physical properties occur when nylon 6, nylon 6:6, and nylon 6:10 are treated in this fashion.

EXAMPLE III

The procedure as set forth in example I may be repeated utilizing N,N-dimethyl benzamide with similar improvements noted.

EXAMPLE IV

The procedures set forth in example I may be repeated with N,N-dimethyl-meta-toluamide with improvements derived in knot strength.

It will, of course, be appreciated that the aliphatic analoges of these amides may be employed to advantage. For example, N,N-diethyl cyclohexamide may be utilized in the same fashion as the aromatic N,N-diethyl-meta-toluamide.

When the amide plasticizing composition is added to the molding pellets or powder prior to extrusion, it may be present in an amount ranging from about 0.5 percent up to about 10 percent by weight of the nylon. Good results are obtained when an admixture is prepared utilizing N,N-diethyl-meta-toluamide in this composition range, and these results are achieved in spite of a partial loss of the N,N-diethyl-meta-toluamide during drying and prior to extrusion.

While the reasons for achieving the enhanced physical properties are not entirely understood, it is believed to be due to the fact that the chemical structure of the amide composition contains an amide linkage which is substantially identical to the amide linkage found in nylon, and this linkage, by appropriate hydrogen bonding, may act as a chemical cross-linking agent for the nylon amide linkage. This appears to be verified, since the existence of additional cross-linking is reasonably expected to be responsible for the higher strength values observed. This hardening or strengthening effect is, however, at least partially offset by the softening experienced by the plasticization. The flexibility and smooth surface feel of the line are not adversely altered.

What is claimed is:

1. The method of plasticizing nylon filamentary products which comprises introducing to said filamentary product a plasticizing quantity of an amide having the structural formula:

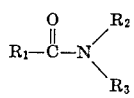

wherein $R_1$ represents an aromatic or an aliphatic radical selected from the group consisting of benzyl, toluyl, xylyl and napthyl radicals, and cyclohexyl and alkyl substituted cyclohexyl radicals; $R_2$ represents a radical selected from the group consisting of hydrogen and alkyl groups having from one to 10 carbon atoms; and $R_3$ represents an alkyl group having from one to 10 carbon atoms.

2. The method of plasticizing nylon filamentary products as set forth in claim 1 being particularly characterized in that said plasticizing amide is thoroughly mixed with the nylon material and dispersed therein prior to the formation of filamentary products therefrom.

3. The method as set forth in claim 2 being particularly characterized in that said plasticizing amide is N,N-diethyl-meta-toluamide and is included in the nylon material prior to the formation of filamentary products in the amount of from about 0.5 percent up to 10 percent.

4. The method of plasticizing nylon filamentary products as set forth in claim 1 being particularly characterized in that said plasticizing amide is applied as a surface film to the nylon filamentary products.

5. A polyamide filamentary product comprising a nylon reactant product having incorporated therein less than about 0.5 percent of a plasticizing amide having the structural formula:

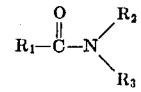

wherein $R_1$ represents an aromatic or an aliphatic radical selected from the group consisting of benzyl, toluyl, xylyl and napthyl radicals, and cyclohexyl and alkyl substituted cyclohexyl radicals; $R_2$ represents a radical selected from the group consisting of hydrogen and alkyl groups having from one to 10 carbon atoms; and $R_3$ represents an alkyl group having from one to 10 carbon atoms.

6. The nylon filamentary product as defined in claim 5 being particularly characterized in that said plasticizing amide is present as a surface film.

7. The nylon filamentary product as defined in claim 5 being particularly characterized in that said plasticizing amide is incorporated and distributed substantially uniformly throughout the filamentary product.

8. The nylon filamentary product as defined in claim 5 being particularly characterized in that said plasticizing amide is N,N-diethyl-meta-toluamide.

* * * * *